(No Model.) 2 Sheets—Sheet 1.

C. M. CONRADSON.
CHUCK.

No. 523,328. Patented July 24, 1894.

Conrad M. Conradson
Inventor:
by Dodge Sons
Attys.

Witnesses:
Arthur Ashley
Horace A. Dodge (No Model.) 2 Sheets—Sheet 2.

C. M. CONRADSON.
CHUCK.

No. 523,328. Patented July 24, 1894.

Witnesses:
Arthur Ashley
Horace A. Dodge

Conrad M. Conradson
Inventor:
by Dodge Sons
Attys.

UNITED STATES PATENT OFFICE.

CONRAD M. CONRADSON, OF MADISON, WISCONSIN.

CHUCK.

SPECIFICATION forming part of Letters Patent No. 523,328, dated July 24, 1894.

Application filed November 23, 1893. Serial No. 491,788. (No model.)

*To all whom it may concern:*

Be it known that I, CONRAD M. CONRADSON, a citizen of the United States, residing at Madison, in the county of Dane and State of Wisconsin, have invented certain new and useful Improvements in Chucks, of which the following is a specification.

My invention relates to chucks, and, while designed more particularly for use in connection with screw machines, is obviously capable of application to other machines; the object of the invention being to provide a strong, cheap, and serviceable chuck, the jaws of which shall be actuated through or by means of the rotation of the arbor to which the chuck is applied.

Figure 1:
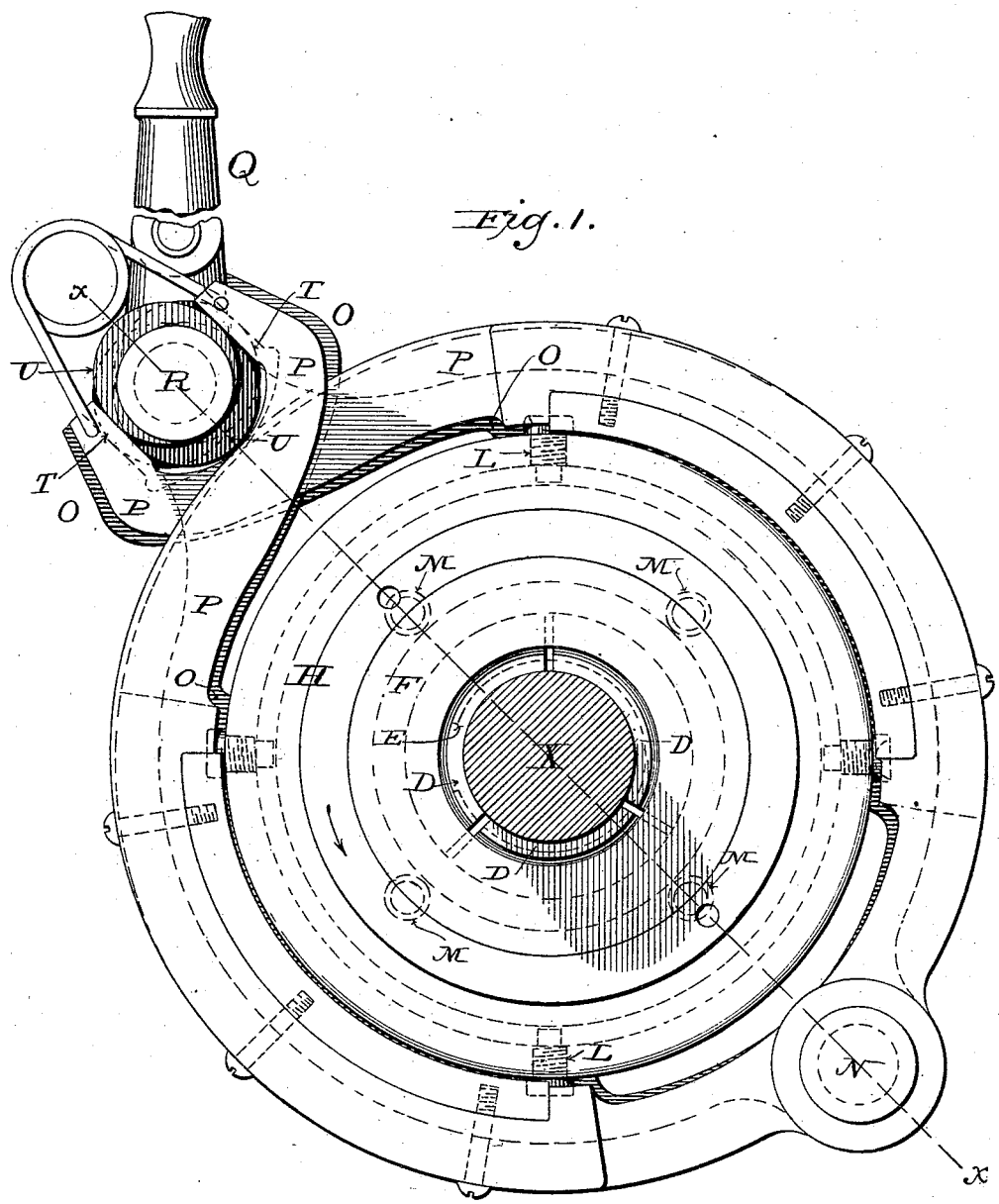
Figure 2:
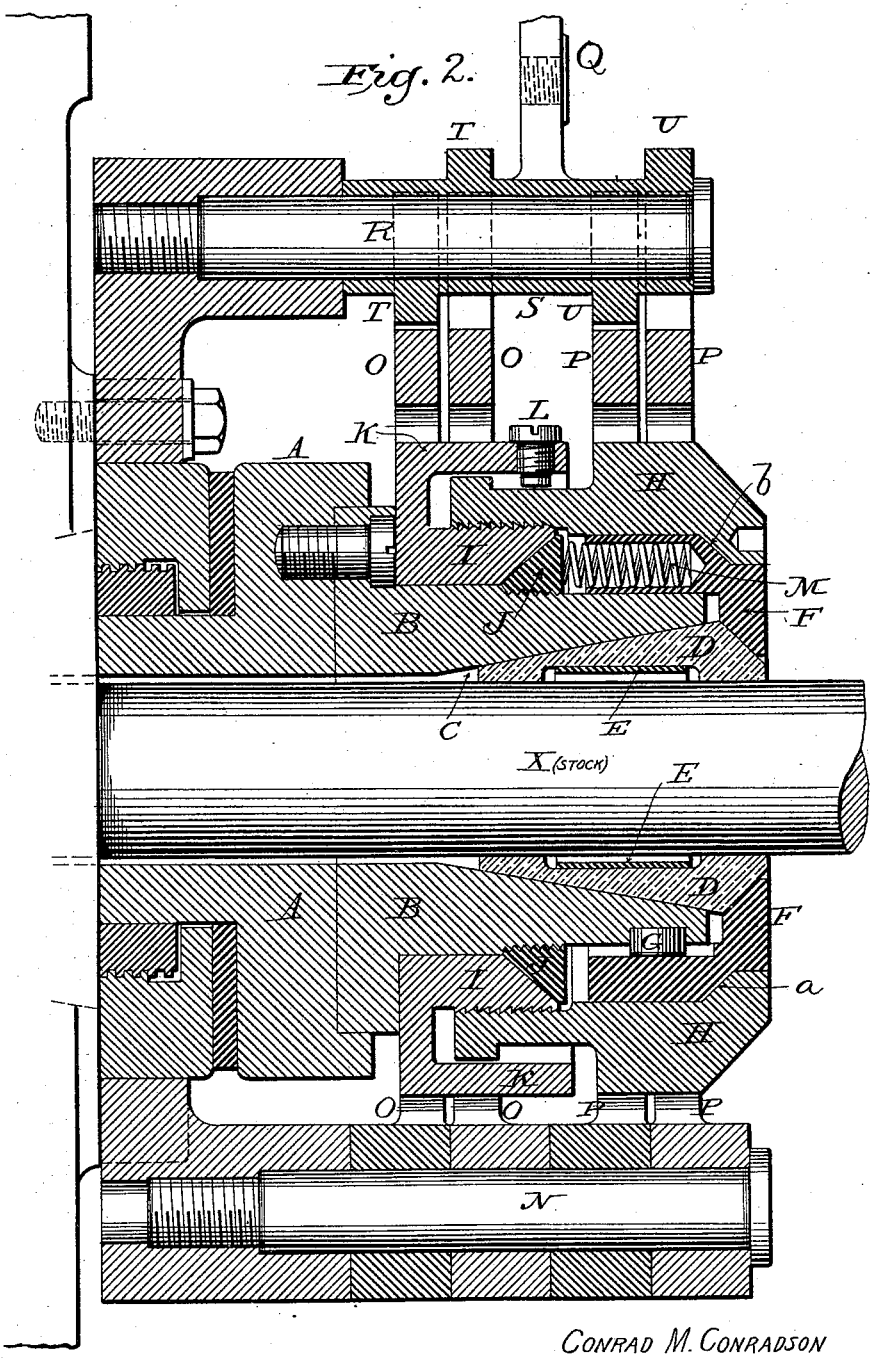

In the drawings,—Figure 1 is a face or end view of my chuck; and Fig. 2, a longitudinal view of the same on the line $x$—$x$.

A indicates an arbor,—in the present instance the hollow arbor of a screw machine,— provided with an extension or projecting portion B which may be made integral with the arbor or separate therefrom as preferred. In the end of the arbor, or its extension, is formed a conical socket C fitted to receive the jaws D, the number of which may be varied as desired. Ordinarily three will be found to be the best number, and these are held to their seat by means of the curved leaf springs E, shown in section in Fig. 2, and by dotted lines in Fig. 1. These jaws D are moved inward into their socket, to cause them to grasp the stock X or other article to be held, by means of a cap F which is held against rotation independently of the arbor A, by means of a key G, Fig. 2.

As shown in Fig. 2, cap F is in turn encircled by a ring H which has an inclined bearing face $a$ (at an angle of about forty-five degrees) which engages a corresponding beveled edge or face $b$ on the periphery of the cap. The inner end of the ring is threaded internally,—Fig. 2,—to screw upon a threaded collar I loosely encircling the arbor, or more properly the arbor-extension B,—which collar is prevented from moving lengthwise upon said extension by means of a retaining ring J and a shoulder on the arbor.

In order to secure an extended frictional bearing surface between the ring J and the collar I, their contacting faces are made at an angle of about forty-five degrees, more or less.

Collar I, Fig. 2, has an overhanging flange K in which is carried a stop,—made in the form of a screw L,—which projecting into a circumferential groove on the exterior of ring H, prevents the latter from moving outward too far. Between the ring J and the cap F are coiled springs M which tend constantly to press the cap F outward to release the jaws; the said spring being preferably seated in sockets in the cap in order to permit the use of long and comparatively strong springs.

Hinged or pivoted to a post or stud N projecting from the headstock or from a bracket secured thereto, are the brake-shoes O O and P P which will be faced with wood, leather or other suitable material. Two of these shoes O O,—see Fig. 2,—are designed to be brought into frictional contact with the flange or periphery of the collar I and hold said collar against rotation, while the other two, P P, are designed to similarly act upon the ring H; but in all cases act alternately with the shoes O O.

Q, Figs. 1 and 2, indicates a hand lever journaled or pivoted upon a stud or post R projecting from the headstock or from a bracket secured thereto, and provided with an elongated hub S formed with four eccentrics or cams T T and U U,—the former being designed to act upon the brake shoes O O and the latter upon the brake shoes P P. By moving the hand lever Q in one direction the cams T T will act upon the shoes O O, while by moving it in the opposite direction, the cams T T will be thrown out of action and the cams U U brought to bear upon the brake shoes P P.

The operation of the chuck is as follows: Assuming that the arbor is rotating and that it is desired to move the rod or stock X lengthwise, the first thing to be done is to loosen the hold of the jaws upon the stock. This result is secured by throwing the hand lever Q back and causing its cams T T to force the brake shoes O O into contact with the screw or screw-collar I to hold said collar against rotation. Now, as the screw thread is a right-hand thread and the arbor is rotating in the direction of the arrow in Fig. 1, and, furthermore, as the ring H is rotating with the spindle, the result upon clamping collar I is that the said ring H unscrews from the collar and moves outward until stopped by the stop screw L. This outward movement of the ring H releases the springs M and permits said springs to move the cap F outward with the ring as the latter moves outward, and thus releases the hold of the jaws upon the stock. The stock may now be fed forward automatically, or otherwise, to the desired point. The hand lever Q is now thrown forward, to enable its cams U U to act upon the brake shoes P P and cause the latter to bind upon and hold the ring H against rotation. This actuation of the lever Q throws the cams T T and brake shoes O O out of action, and releases the collar I and thereby permits said collar to rotate with the arbor. Of course as the collar I rotates and the ring H is held against rotation, the collar will screw into the ring, or in other words draw the ring farther upon it, and as the inward movement of the ring H is followed by a corresponding movement of the cap F, the latter will force the jaws D into the socket or seat C and cause them to bite or grasp the rod or stock X.

By making the bearing surfaces between the ring H and cap F, and between the collar I and ring J, beveled as shown, I secure sufficient frictional contact to overcome the friction at the screw thread. I do not, however, wish to be understood as limiting myself to the precise angle shown, for the angle can be varied through a considerable range, depending upon the proportions of other parts of the chuck. The brake mechanism can also be varied almost indefinitely, as may also the form of the jaws, and hence I do not wish to limit myself to the precise forms shown.

The essential features of the invention reside first in the employment of the threaded parts H and I and means for holding, alternately, one of said parts against rotation to effect the actuation of the jaws; second, in the employment of the springs M for causing the outward movement of the cap F bearing directly upon the jaws; and third, means for limiting such movement.

In a sense, the cap F forms a part of the ring H, but, while it partakes of the longitudinal movements of the ring, it does not rotate independently of the arbor, as does the ring when not held by the brake shoes P.

Having thus described my invention, what I claim is—

1. In combination with a rotatable arbor provided with clamping-jaws; a threaded collar mounted loosely upon the arbor; an independent ring having a thread to engage the collar and adapted, when moved inward, to cause the jaws to clamp the stock; and means for holding the collar and the ring, alternately, against rotation.

2. In combination with a rotatable arbor provided with clamping-jaws; a threaded collar mounted loosely upon the arbor; a ring having a thread to engage the collar and adapted, when moved inward, to cause the jaws to clamp the stock; means for holding the collar and the ring, alternately, against rotation; and springs for moving the jaws outward when released by the ring.

3. In combination with a rotatable arbor adapted to rotate continuously in one direction; clamping jaws carried thereby; jaw-actuating mechanism comprising two independent members having a screw-thread connection and mounted upon the arbor so as to be capable of rotation therewith or independently thereof; and means for holding either of said members against rotation.

4. In combination with the arbor A B provided with socket C and jaws D; the cap F adapted to slide upon the arbor; the threaded ring H having frictional contact with the cap, and having, also, a screw thread at its inner end; the loose threaded collar I to engage the ring; the springs M to urge the cap outward; and mechanism for holding the ring and collar against rotation.

5. In combination with the arbor A B, having socket C and jaws D; the threaded ring and collar; means for holding said ring and collar against rotation; and the stop L carried by the collar to limit the movement of the ring.

6. In combination with a rotatable arbor and the jaws carried thereby; the independent threaded collar and ring mounted upon the arbor to actuate the jaws; a brake shoe O for the collar; a brake shoe P for the ring; and a lever Q provided with the eccentrics to operate upon the brake shoes alternately.

7. In combination with the arbor and the jaws carried thereby; the clamping ring J having a beveled face; the threaded collar I having a corresponding beveled face; the threaded ring H to engage the collar I; and means for holding the ring H and collar I, alternately, against rotation.

8. In combination with the arbor and the jaws carried thereby; the threaded collar I; the cap F provided with beveled face $b$; the threaded ring H provided with a co-acting beveled face $a$; and means for holding the ring and collar against rotation.

In witness whereof I hereunto set my hand in the presence of two witnesses.

CONRAD M. CONRADSON.

Witnesses:
W. R. BAGLEY,
S. HIGHAM.